May 3, 1949. M. A. GARRIS 2,469,034
COMBINED CONDIMENT CONTAINER
Filed Nov. 25, 1947 2 Sheets-Sheet 1
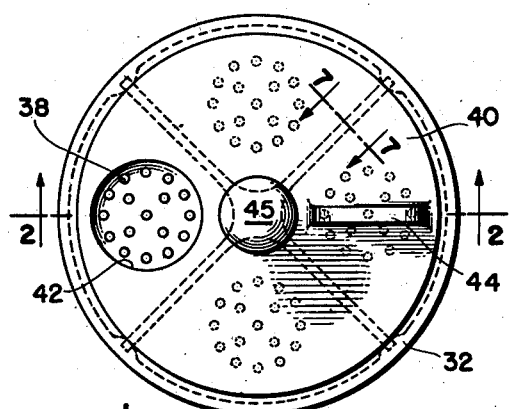
FIG—1
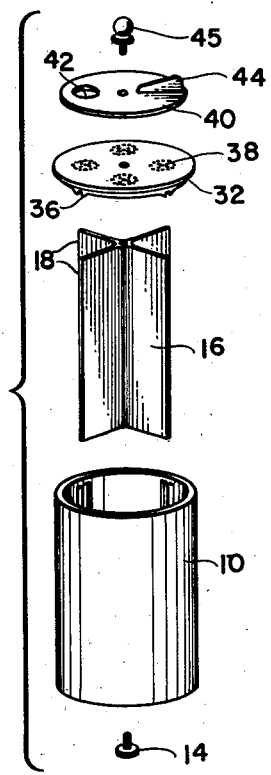
FIG—3
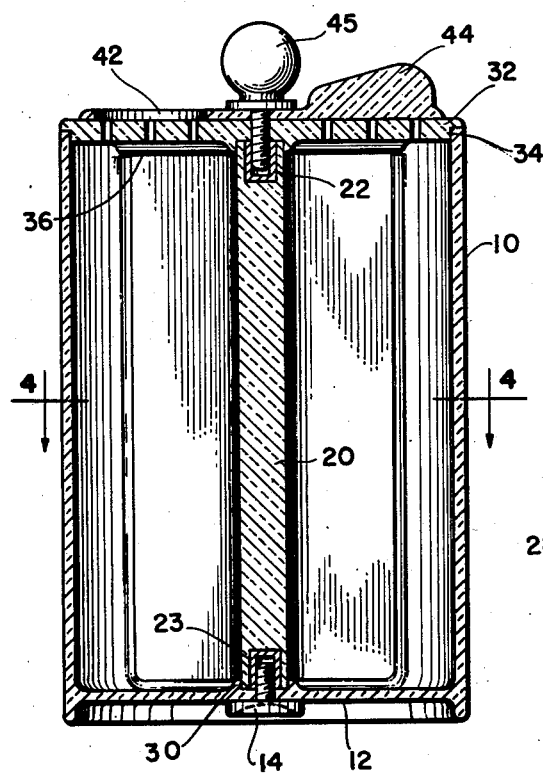
FIG—2
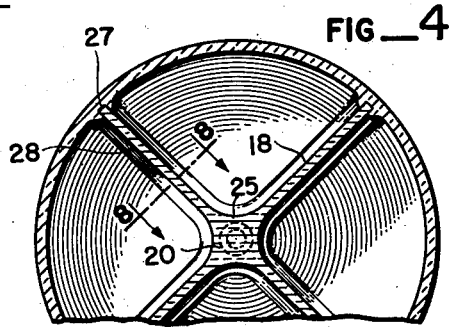
FIG—4
MARIAN A. GARRIS
Inventor
By Smith & Tuck
Attorneys May 3, 1949.  M. A. GARRIS  2,469,034
COMBINED CONDIMENT CONTAINER
Filed Nov. 25, 1947  2 Sheets-Sheet 2
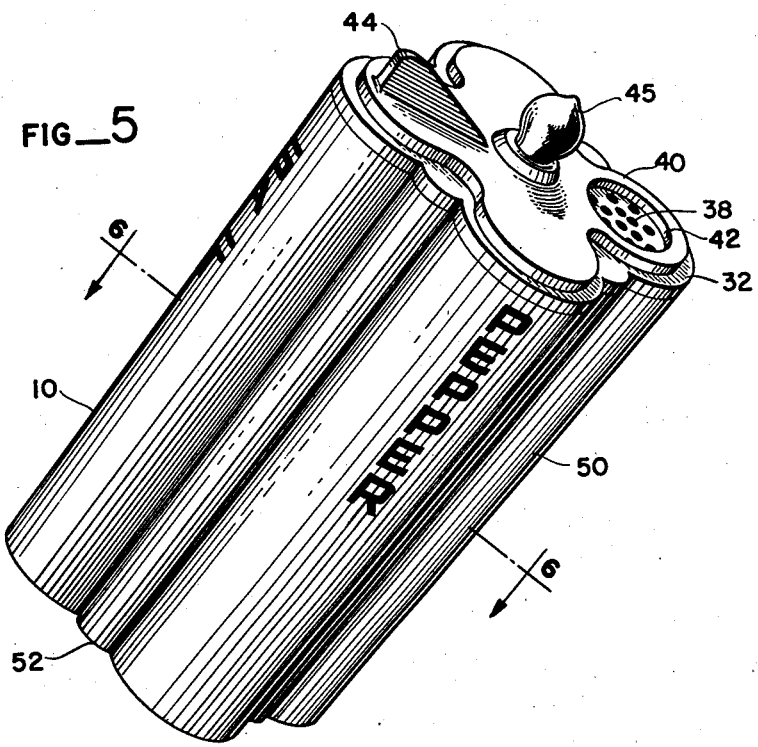
FIG_5
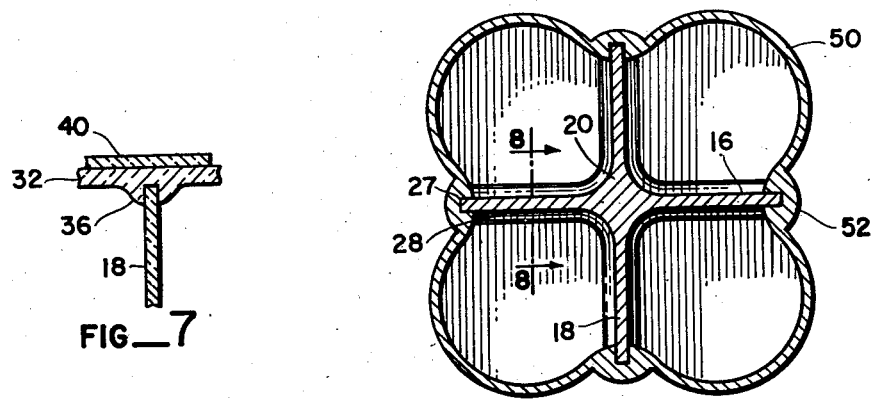
FIG_6
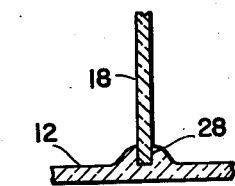
FIG_7
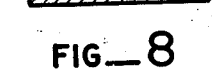
FIG_8
MARIAN A. GARRIS
Inventor
By Smith & Tuck
Attorneys Patented May 3, 1949

2,469,034

UNITED STATES PATENT OFFICE 2,469,034

COMBINED CONDIMENT CONTAINER

Marian A. Garris, Seattle, Wash.

Application November 25, 1947, Serial No. 788,003

2 Claims. (Cl. 65—45)

My present invention relates to the general art of condiment containers and, more particularly, to a combined condiment container.

In modern home design, great stress is placed on having the kitchen a handy place in which to work. This is based upon the premise that the average housewife can expect to be less and less dependent upon domestic help and, for this reason, the modern kitchen has greatly increased in expense until it becomes one of the major expense units in modern home construction. It is with this general background in mind that I have produced my present multiple condiment container, so that the housewife, instead of reaching for several different condiment containers, using them, and replacing them after such use, can now group in a single unit, say four, the most commonly used condiments and have them immediately available in a single unit.

Many devices endeavoring to serve this purpose have been offered in the past. However, it was not until the general acceptance of plastic materials for such devices that a design which appears to overcome all the past deficiencies could be produced. In the past, it was generally conceded that to have more than two condiments in a single container presented many problems, such as the intermingling of the condiments and the difficulty of cleaning the container after prolonged periods of use. In my present construction, I believe I have produced a unit that can be used practically for four, or more, separate condiments, insuring that each will be kept separate from the others at all times, yet the unit is so arranged that it can be completely disassembled and a single large interior presented which is readily available for thorough cleaning; and all the parts, such as the separator, sifter, and the like, coming out as separate units admit of most easy cleaning.

The principal object of my present invention, therefore, is to provide a condiment container which can be used practically for four, or more, separate condiments.

A further object of my invention is to provide means whereby the various condiments can be readily inspected so that a supply will always be on hand. This is achieved by having transparent material for the cannister.

A further object of my present invention is to provide a multi-celled container for condiments which can be easily dis-assembled for thorough cleaning.

A further object of my invention is to provide means whereby my container can be readily dis- assembled and so, protect the wearing parts that it can be expected to give satisfactory use over long periods.

Further objects, advantages and capabilities will be apparent from the description and disclosure in the drawings or may be comprehended or are inherent in the device.

In the drawings:

Fig. 1 is a top plan view of a multi-celled condiment container made after the teachings of my present invention;

Fig. 2 is a vertical sectional view taken along the line 2—2 of Fig. 1.

Fig. 3 is a bracketed exploded view showing the various elements making up my condiment container.

Fig. 4 is a horizontal cross-sectional view, part of which is broken away, taken along the line 4—4 of Fig. 2.

Fig. 5 is a perspective view showing a preferred form of my invention.

Fig. 6 is a cross-sectional view taken along the plane of line 6—6 of Fig. 5.

Fig. 7 is a fragmentary cross-sectional view taken along the line 7—7 of the top assembly of Fig. 1.

Fig. 8 is a fragmentary cross-sectional view taken along line 8—8 of Fig. 4 and Fig. 6.

Referring more particularly to the disclosure in the drawings, the numeral 10 designates the main body or container for a simple form of my unit. This, as I have shown in the drawings, may be cylindrical in form, or other outside configurations may be employed to give a cloverleaf effect, as shown in Figs. 5 and 6, or other desirable outside appearances. It is, however, desirable that the thickness of material from the standpoint of economical molding from plastics will be of substantially uniform thickness. Body 10 is provided with a raised bottom or floor portion 12. This feature normally causes the cannister to set on a working surface easier, and it also provides space for an assembling screw as 14, which screw I prefer to form with the so-called coin-slot, so that it can be turned, as in starting and seating, with the aid of a coin.

The interior of body 10 is divided into three or more divisions (in my drawing I have shown four) by the removable multi-partition member 16. This member is provided with walls, as 18, one for each cell desired. The various walls are joined together by central core member 20 of increased thickness, so as to give strength and to provide adequate material for the insertion of molded-in metal bushing members, as 22 and 23, which are interiorly threaded and, by the molding process, are fixedly secured within member 16. Attention is invited to Fig. 4 in which it is indicated that the corners where the junction between walls 18 and the central portion 20 occur are provided with fillets of considerable radius as 25, so as to avoid any sharp corners that would be difficult to clean.

In order to provide definite security against the intermingling of various condiments that might be stored in adjacent cells of my container, I provide that the inner surface of the body 10 be provided with grooves, as 27, in the side walls and similar grooves, as 28, in the bottom of member 10. These I prefer to form after the showing of Figs. 2 and 4, by raising the material of body 10 adjacent the grooved portion so that no point of weakness is provided where these grooves occur, but rather that the material is a little thicker at these points, so that the sharp corners required will not promote natural lines of breakage. This same grooving accepts the fillet as illustrated at 27, and is also shown in Fig. 2 at 30.

As a cover for my container, I provide the cover plate member 32. This, in the form shown, is circular. However, if the body 10 were to be made in a cloverleaf design, or any other configuration other than cylindrical, this plate should conform to such form. To provide proper seating of plate 32, I provide the rabbet at 34, so that a portion of plate 32 fits down inside the bore of container 10 and a portion of it rests on top of the same. This construction is best illustrated in Fig. 2. This provides a seal in two directions, which practically precludes any leakage at this point. The inner surface or lower surface, as viewed in Fig. 2, is in turn provided with grooves to accommodate member 16. This grooving is shown in elevation only by the raised groove-forming ridges at 36.

Plate 32 serves a second function other than merely as a cover for the container, in that it is also the sifter head and for this purpose a plurality of discharge openings 38 are provided, preferably in some geometrical pattern, such as, for instance, a circle as indicated in Fig. 1. The exact form of this pattern is immaterial, providing it is the same for each of the compartments of the container. Further, it may be desirable to have the holes 38 proportioned as to diameter and possible flare, according to the type of condiment that is going to be used in the container. In any event, the group of holes should be substantially centrally located above the compartment they are to serve.

Superposed upon plate 32 is a selector plate 40. This plate is provided with a plane bottom surface so that it will rest in snug engagement with the top plane surface of plate 32. At one point in its area, the plate 40, however, is provided with an opening 42 sufficient in extent to encompass any one group of discharge holes. In the drawing I have shown this opening as round. On the upper surface of plate 40 I provide a finger engageable boss or lug 44, so as to provide for the easy movement of plate 40, and to thus make it possible to hold the container with one hand and with a finger or thumb of that hand operating the top plate, so that the housewife can select the condiment discharge opening she wishes to use.

As my container is assembled, the first operation is to insert separator 16 within grooves 27 and press the same down to the bottom where grooves 28 are engaged. The next operation is to place the holding screw 14 in position, thus fixedly securing the separator within body 10. This is the form of my device when it is charged with condiments or when replenishing of one or two of the condiments is necessary. Next in the order of assembly is to put plate 32 in place by turning it until the upper edges of member 16 engage into the grooves formed on the lower surface of plate 32. When this is achieved, the plate can be pressed fully home so that it forms a tight seal with the upper part of body 10. The next member to go in place is the selector plate 40 and then, finally, the securing screw 45. This screw, passing as it does through plate 40 and plate 32 into the threaded bushing member 22, which in manufacture has been molded into member 16, provides a secure final assembly, and the tension placed by screw 45 on the assembly will determine the amount of friction between plates 40 and 32 and this should be adjusted to the convenience of the housewife using the device.

In Figs. 5 and 6 I have illustrated a preferred form of my container in which the general cylindrical form is made up of a plurality of semi-cylindrical portions 50 which are joined by arcuate bead members 52. All other parts of my unit are similar to the simplified form described. It has been found that this clover-leaf form is easier to hold in the hand, and the various condiment chambers are more easily identified and can thus be more readily held in the most satisfactory position for use.

It will now be apparent, it is believed, that the various condiments are all readily available for use but are so thoroughly separated from each other that there can be no intermingling of the same. Further, it will be apparent that, by a reversal of the assembly operation, the whole device can be dis-assembled to the components shown in Fig. 3, at which time each of these components can be readily cleaned.

It is believed that it will be clearly apparent from the above description and disclosure in the drawings that the invention comprehends a novel construction of a combined condiment container.

Having thus disclosed the invention, I claim:

1. A combined condiment container, consisting of: a body of substantially cylindrical form; a bottom for said body formed as part thereof, and raised above the lower end of said body; a partition member having a central core and a plurality of partition walls extending radially therefrom and adapted to form a plurality of chambers; enlarged fillets connecting said walls and said core; ridges formed on the interior of said body, in which are parallel walled grooves adapted to closely engage the outer edges of said partition walls; ridges formed on the upper surface of said bottom having parallel walled grooves adapted to closely engage the bottom edges of said partition walls; a cover plate adapted to seat within said body and to overlap the upper edge thereof; a plurality of groups of discharge holes formed in said cover plate; ridges on the under side of said cover plate, having parallel walled grooves adapted to closely engage the upper edges of said partition walls and to thus angularly position said groups of holes centrally over said chambers; a selector plate disposed upon said cover plate and adapted to revolve concentrically therewith; a discharge opening formed in said selector plate and adapted to selectively engage a desired group of discharge holes and to close off the remaining groups of discharge holes; means for securing said partition member in said body; means for securing said cover plate to said partition member and in close engagement with said body and means for securing said selector plate revolvably, in close engagement with said cover plate.

2. A combined condiment container formed of molded material, consisting of: a body of substantially cylindrical form; a bottom for said body formed as part thereof, and raised above the lower end of said body; a partition member having a central core and a plurality of partition walls extending radially therefrom and adapted to form a plurality of chambers; enlarged fillets connecting said walls and said core; ridges formed on the interior of said body, in which are grooves adapted to closely engage the outer edges of said partition walls; ridges formed on the upper surface of said bottom having grooves adapted to closely engage the bottom edges of said partition walls; a cover plate adapted to seat within said body and to overlap the upper edge thereof; a plurality of groups of discharge holes formed in said cover plate; ridges on the under side of said cover plate adapted to closely engage the upper edges of said partition walls and to thus angularly position said groups of holes centrally over said chambers; a selector plate disposed upon said cover plate and adapted to revolve concentrically therewith; a discharge opening formed in said selector plate and adapted to selectively engage a desired group of discharge holes and to close off the remaining groups of discharge holes; an interiorly threaded bushing secured in each end of said partition member core; a screw passing through the bottom of said container for securing said partition member in said body; a screw passing through said cover plate for securing said cover plate to said partition member and in close engagement with said body and means for securing said selector plate revolvably, in close engagement with said cover plate.

MARIAN A. GARRIS.

REFERENCES CITED

The following references are of record in the file of this patent:

UNITED STATES PATENTS

| Number | Name | Date |
| --- | --- | --- |
| 225,143 | Kahler | Mar. 2, 1880 |
| 880,082 | Kendrick | Feb. 25, 1908 |
| 1,208,189 | Miller | Dec. 12, 1916 |
| 1,339,173 | Douledes | May 4, 1920 |
| 1,602,745 | Binkele | Oct. 12, 1926 |
| 1,715,754 | Harris | June 4, 1929 |
| 1,801,241 | Styx | Apr. 14, 1931 |
| 1,925,962 | Hoyer | Sept. 5, 1933 |
| 1,979,198 | Hart | Oct. 30, 1934 |
| 2,000,818 | Bomberger | May 7, 1935 |
| 2,173,542 | Simington | Sept. 19, 1939 |
| 2,241,044 | Stenberg | May 6, 1941 |

FOREIGN PATENTS

| Number | Country | Date |
| --- | --- | --- |
| 79,958 | Sweden | Mar. 27, 1934 |